Sept. 19, 1961    N. F. SCHUH ET AL    3,001,100
UNDERVOLTAGE SENSING CIRCUIT
Filed Oct. 27, 1958

WITNESSES
Leon J. Faya
James F. Young

INVENTORS
Niles F. Schuh and
Lewis R. Lowry, Jr.
BY F. P. Lyle
ATTORNEY

United States Patent Office 3,001,100
Patented Sept. 19, 1961

3,001,100
UNDERVOLTAGE SENSING CIRCUIT
Niles F. Schuh and Lewis R. Lowry, Jr., Lima, Ohio, assignors to Westinghouse Electric Corporation, East Pittsburgh, Pa., a corporation of Pennsylvania
Filed Oct. 27, 1958, Ser. No. 769,649
4 Claims. (Cl. 317—31)

The present invention relates to undervoltage sensing circuits and, more particularly, to means for sensing the lowest phase voltage of a polyphase alternating current system.

In the operation of polyphase alternating current electrical systems, it is frequently necessary to sense the system voltage or the phase voltage to obtain signals for actuation of protective or control devices such as protective relays or voltage regulators. In some types of protective systems, it is necessary to sense the lowest phase voltage and sensing means must be provided for this purpose which will respond to the lowest one of the phase voltages and be unaffected by the other phase voltages. This has been done heretofore by using separate electromechanical undervoltage relays for each phase with their contacts connected in parallel to energize a time delay relay which in turn actuates a control device to perform the desired function in response to undervoltage of any phase. In a three-phase system, this arrangement requires three under-voltage relays and a time delay relay. Furthermore, it is usually necessary or desirable for the pickup and dropout points of the relays to be quite close together and this usually requires the use of an additional relay for each phase or of a special detent circuit.

In many applications, such as in aircraft electrical systems, this large number of relays is very undesirable because of the space required and the weight, and this prior arrangement is not sufficiently reliable for aircraft applications because of the difficulty of maintaining accurate calibration of sensitive relays under the adverse environmental conditions encountered in aircraft service, such as high acceleration forces, extreme range of ambient temperatures, and severe vibration. For these reasons, the use of electromechanical relays is very undesirable and the undervoltage sensing systems which have been used heretofore utilizing such relays are unsatisfactory.

The principal object of the present invention is to provide a completely static undervoltage sensing circuit which senses the lowest phase voltage of a polyphase alternating current system and which requires no relays or other devices having moving parts or requiring accurate calibration.

Another object of the invention is to provide an undervoltage sensing circuit for sensing the lowest phase voltage which includes time delay means and which consists entirely of rugged and highly reliable static devices, so that the circuit can be made very small and compact but has high reliability since it comprises only static devices which have no moving parts.

Other objects and advantages of the invention will be apparent from the following detailed description, taken in connection with the accompanying drawing, in which.

Figure 1:
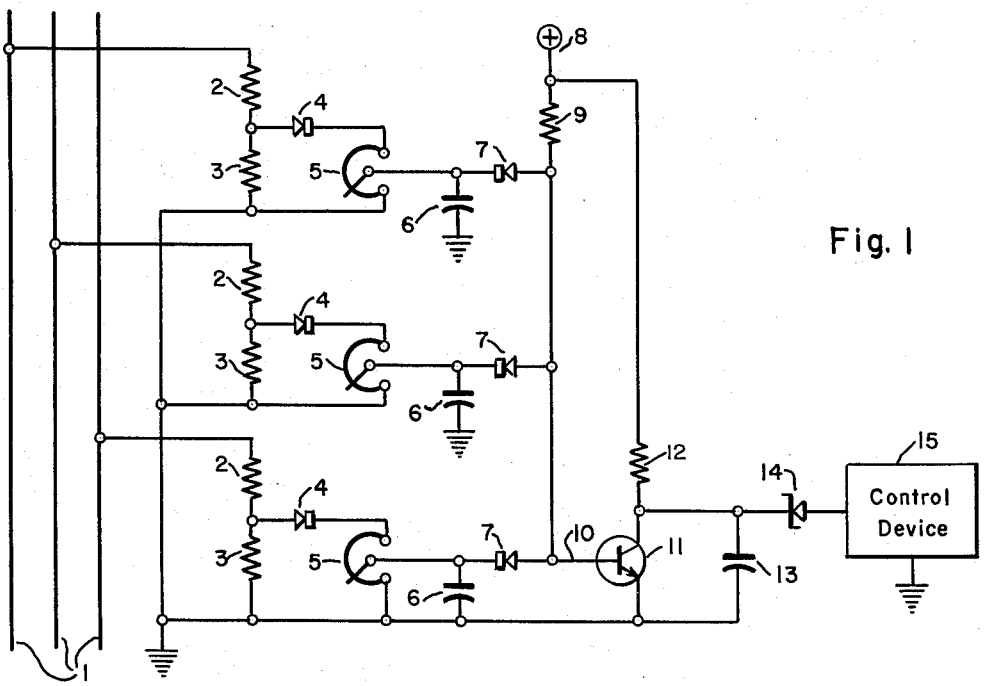
FIGURE 1 is a schematic diagram showing one embodiment of the invention.

The invention is shown in FIG. 1 embodied in an undervoltage sensing circuit connected to sense the phase voltages of a three-phase line 1. The sensing circuit is shown connected directly to the line but it will be understood that it might be connected through potential transformers if desired. The sensing circuit includes voltage sensing means for each phase, all of these sensing means being identical. The sensing means of each phase includes a voltage divider, consisting of series-connected resistors 2 and 3, connected between the line 1 and ground. A rectifier 4, which may be a semiconductor diode, is connected between the voltage divider and an adjustable potentiometer 5 which is connected across the resistor 3. The diode 4 rectifies the alternating current signal obtained from the voltage divider while the potentiometer 5 provides means for adjustment or calibration of the circuit. Thus, a unidirectional output signal is obtained from the potentiometer 5 which is proportional to the voltage to ground of the phase to which the potentiometer is connected. A filter capacitor 6 is preferably connected across the potentiometer 5 to reduce the ripple in the direct current output signal, and the signal is applied as a reverse biasing voltage to a rectifier 7 which is preferably also a semiconductor diode.

The three diodes 7 of the individual sensing circuits for the three phases are connected to any suitable source of direct current, indicated at 8, through a current limiting resistor 9, so that current from the source 8 can flow to ground through one or more of the diodes 7 in the absence of reverse biasing signals of sufficient magnitude applied to the diodes 7. It will be seen that the sensing circuits and diodes 7 constitute an AND circuit since, in the absence of an input signal of sufficient magnitude to any one of the diodes, the direct current source 8 is connected to ground, but when all three of the diodes 7 are biased in the reverse direction, current flow through the diodes is blocked and an output signal appears on the conductor 10.

The conductor 10 is connected to the base of a transistor 11. The emitter of the transistor is connected to ground and the collector is connected to the direct current source 8 through a current limiting resistor 12. The transistor 11 is thus connected to constitute a NOT circuit and an output signal is obtained at the collector in the absence of an input signal on the conductor 10, as more fully explained below.

In most cases, a time delay is desired, in order to prevent operation of a control device on transients of brief duration, and the output signal of the transistor 11 is therefore preferably applied to control a time delay circuit. The time delay circuit consists of a capacitor 13 connected across the emitter and collector of the transistor and a Zener diode 14 connected to respond to the voltage of the capacitor 13. The output of the time delay circuit is connected to actuate a control device 15, which may be of any suitable type to effect the desired response to undervoltage of any phase of the line 1. Thus, the control device 15 might be a relay but it is preferably a static device, such as a flip-flop circuit or an amplifier, which provides an output signal to effect the desired response.

In the operation of this system, under normal conditions when the voltages of all three phases are above the desired minimum value, a unidirectional signal is applied from the sensing circuit of each phase to the corresponding diode 7 and biases the diode in the reverse direction so that current flow through the diode is blocked. Under these conditions, with all the diodes 7 blocked, an output signal appears on the conductor 10 from the direct current source 8. This signal is applied to the base of the transistor 11 and causes the transistor to be conductive between the collector and the emitter. The voltage drop between collector and emitter under these conditions is negligibly small, so that the collector is substantially at ground potential and no output signal appears at the collector, current from the direct current source 8 flowing directly to ground through the transistor and the current limiting resistor 12.

If the voltage of any phase of the line 1 falls below the predetermined value, the proportional voltage signal applied to the corresponding diode 7 falls to a sufficiently low value to unblock the diode, and current from the direct current source 8 is thus permitted to flow to ground through the diode 7. This removes the output signal from the conductor 10 and the signal to the base of the transistor 11 is cut off. The transistor is thus made non-conductive and an output signal voltage appears at the collector. This output signal is applied to the capacitor 13 and the capacitor charges at a rate determined by the resistor 12 and the capacitance of the capacitor. The voltage of the capacitor 13 is applied to the Zener diode 14. It will be understood that a Zener diode is a semiconductor diode, preferably silicon, which has the characteristic of being substantially non-conducting in the reverse direction until a predetermined breakdown voltage is reached. When the voltage reaches this value, the diode conducts freely as long as the voltage stays above the break-down value. When the voltage falls below this value, the diode again becomes substantially non-conducting. The charging rate of the capacitor 13 and the break-down value of the diode 14 thus determine the time delay, since no current can flow to the control device 15 until the voltage of the capacitor 13 reaches the break-down value of the diode 14. When this occurs, an output signal is applied to the control device 15 to cause it to operate to obtain the desired response to the undervoltage.

It will be seen that a completely static undervoltage sensing device is thus provided which responds to the lowest phase voltage of a three-phase system to provide an output signal after a time delay when the lowest phase voltage falls below a predetermined value. As previously pointed out, the circuit consists essentially of a voltage sensing means for each phase connected through an AND circuit to a transistor NOT circuit, so that an output is obtained from the transistor in the absence of a signal from the AND circuit, which indicates undervoltage of one phase. In most cases, a time delay is desirable, but if it is not required in a particular case, the time delay circuit could be omitted and the output signal from the transistor applied directly to the control device 15.

Figure 2:
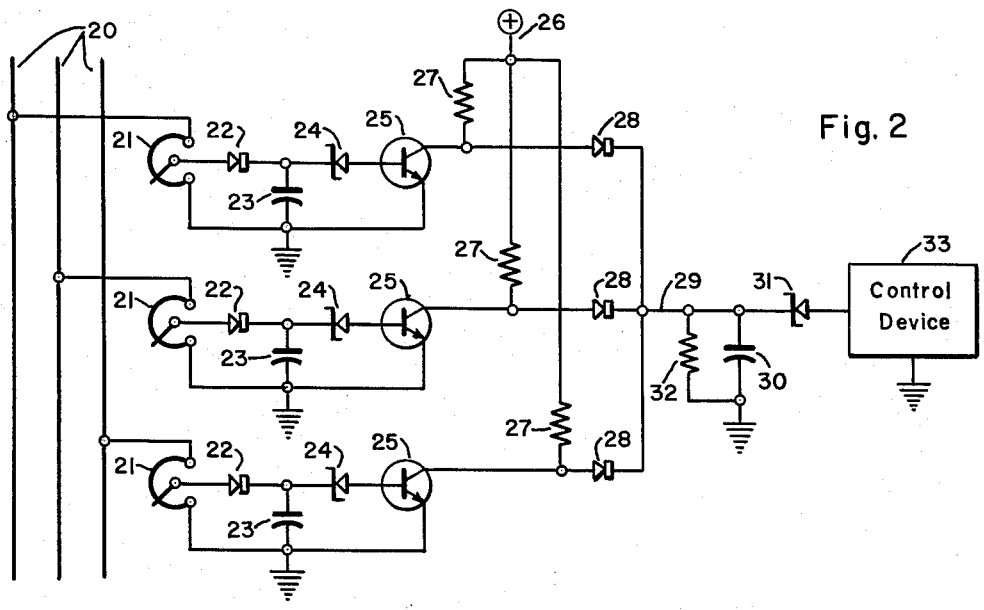
FIG. 2 is a similar diagram showing another embodiment of the invention.

Another embodiment of the invention is shown in FIG. 2. In this figure, the undervoltage sensing circuit is connected to sense the phase voltages of a three-phase line 20 and, as before, identical voltage sensing means are provided for each phase. Each of these voltage sensing means comprises an adjustable potentiometer 21 connected from the corresponding phase of the line 20 to ground. A rectifier 22, preferably a semiconductor diode, is connected to each potentiometer and a filter capacitor 23 is preferably connected across the potentiometer to reduce the ripple in the direct current output signal. It will be seen that a direct current signal is obtained in this way which is proportional to the voltage of the corresponding phase of the line 20. This voltage signal is applied to a Zener diode 24 which is connected to the base of a transistor 25. The emitter of the transistor 25 is connected to ground and the collector is connected to a suitable direct current source 26 through a current limiting resistor 27. The collector of each of the transistors 25 is connected to a diode 28 and the diodes 28 are connected together to an output conductor 29.

The conductor 29 is preferably connected to a time delay circuit consisting of a capacitor 30 connected between the conductor 29 and ground and a Zener diode 31 connected to respond to the voltage of the capacitor 30. A discharge resistor 32 is preferably connected across the capacitor 30. The output of the Zener diode 31 is connected to a control device 33 which may be of any suitable type as described above in connection with the control device 15.

In the operation of this circuit, under normal conditions when the voltage of each phase is above the desired minimum, the direct current signal applied to each Zener diode 24 is above the breakdown voltage of the diode so that the diode is conducting and a signal is applied to the base of the corresponding transistor 25. The transistor 25 is thus made conductive and its collector is substantially at ground potential so that no output voltage appears at the collector, and current from the direct current source 26 flows through the transistor to ground. With this condition on all three phases, no signals are applied to the diodes 28 and no signal appears on the conductor 29.

If one phase voltage falls below the desired value, however, the direct current signal applied to the corresponding Zener diode 24 falls below the cut-off voltage of the diode and the signal to the transistor 25 is cut off. The transistor is thus made non-conductive and an output signal appears at the collector. This signal is applied through the corresponding diode 28 to the conductor 29 and an output signal thus appears on this conductor. This signal is applied to the time delay circuit consisting of the capacitor 30 and diode 31, which operates in the same manner as the time delay circuit previously described to apply a signal to the control device 33 after a predetermined time delay.

It will be seen that the circuit of FIG. 2 consists essentially of three transistor NOT circuits connected to respond to the phase voltages of the line 20 to provide output signals in response to undervoltage indicated by the absence of an input signal, and an OR circuit for applying the output signals of the transistors to the output conductor 29. Thus, the circuit of FIG. 2 is also a completely static circuit which provides an output in response to undervoltage of any phase of the line 20. The Zener diodes 24 in FIG. 2 are provided for the purpose of increasing the voltage sensitivity of the circuit and may not be required in all cases although they are usually desirable. The discharge resistor 32 is provided in the circuit of FIG. 2 to permit the capacitor 30 to discharge in case it becomes only partially charged, as during a transient undervoltage condition which does not continue for the full time delay period. Under these conditions, the capacitor 30 will be left partially charged and the resistor 32 is provided to permit it to discharge. In the circuit of FIG. 1 such a resistor is not necessary since the capacitor 13 can discharge through the transistor 11 under normal conditions.

It should now be apparent that a completely static undervoltage sensing circuit has been provided which is capable of responding to the lowest phase voltage of a polyphase circuit to provide an output signal when any phase voltage falls below a predetermined value. Since the circuit is completely static and consists entirely of small, rugged components of high reliability, it can be made very small and compact and is highly suitable for aircraft use because of its small size and high reliability.

Two specific embodiments of the invention have been shown and described for the purpose of illustration, but it will be apparent that various modifications may be made and that various other embodiments are possible, and all such modifications and embodiments are within the scope of the invention.

We claim as our invention:

1. An undervoltage sensing circuit for responding to the lowest phase voltage of a polyphase alternating current system, said circuit including means connected to each phase of said system for providing a unidirectional voltage proportional to the corresponding phase voltage, rectifier means for each phase for connecting a direct current source to ground, means for connecting said unidirectional voltages to the corresponding rectifier means to bias the rectifier means in the reverse direction, whereby a direct current signal is provided when all of the phase voltages are above a predetermined value, and a transistor controlled by said direct current signal to provide an output signal in the absence of the direct current signal.

2. An undervoltage sensing circuit for responding to the lowest phase voltage of a polyphase alternating current system, said circuit including means connected to each phase of said system for providing a unidirectional voltage proportional to the corresponding phase voltage, rectifier means for each phase for connecting a direct current source to ground, means for connecting said unidirectional voltages to the corresponding rectifier means to bias the rectifier means in the reverse direction, whereby a direct current signal is provided when all of the phase voltages are above a predetermined value, a transistor controlled by said direct current signal to provide an output current in the absence of the direct current signal, a capacitor connected to be charged by said output current, and means for providing an output when the capacitor voltage exceeds a predetermined value.

3. An undervoltage sensing circuit for responding to the lowest phase voltage of a polyphase alternating current system, said circuit including means connected to each phase of said system for providing a unidirectional voltage proportional to the corresponding phase voltage, voltage-responsive semiconductor means for each phase for providing a signal voltage when said unidirectional voltage is above a predetermined value, a transistor for each phase controlled by the corresponding signal voltage to provide an output signal in the absence of the signal voltage, and time delay means actuated by the output signal of any one of said transistors for providing an output after a predetermined time delay.

4. An undervoltage sensing circuit for responding to the lowest phase voltage of a polyphase alternating current system, said circuit including means connected to each phase of said system for providing a unidirectional voltage proportional to the corresponding phase voltage, voltage-responsive semiconductor means for each phase for providing a signal voltage when said unidirectional voltage is above a predetermined value, a transistor for each phase controlled by the corresponding signal voltage to provide an output current in the absence of the signal voltage, a capacitor connected to be charged by the output current of any one of said transistors, and means for providing an output when the capacitor voltage exceeds a predetermined value.

References Cited in the file of this patent

UNITED STATES PATENTS

| | | |
|---|---|---|
| 1,979,054 | Scheer | Oct. 30, 1934 |
| 2,393,043 | Harder | Jan. 15, 1946 |
| 2,594,449 | Kircher | Apr. 29, 1952 |
| 2,769,131 | Immel | Oct. 30, 1956 |